(12) United States Patent
Adomat et al.

(10) Patent No.: US 6,184,819 B1
(45) Date of Patent: Feb. 6, 2001

(54) METHOD OF OPERATING A MULTI-ANTENNA PULSED RADAR SYSTEM

(75) Inventors: Rolf Adomat, Friedrichshafen; Franz Waibel, Bad Wurzach, both of (DE)

(73) Assignee: Automotive Distance, Lindau (DE)

( * ) Notice: Under 35 U.S.C. 154(b), the term of this patent shall be extended for 0 days.

(21) Appl. No.: 09/348,605

(22) Filed: Jul. 6, 1999

(30) Foreign Application Priority Data

Jul. 3, 1998 (DE) .............................. 198 29 762

(51) Int. Cl.$^7$ ................................. G01S 13/536
(52) U.S. Cl. .................. 342/127; 342/70; 342/107; 342/115; 342/146
(58) Field of Search .................. 342/70, 71, 72, 342/107, 109, 113, 114, 115, 127, 128, 133, 135, 139, 140, 146, 155

(56) References Cited

U.S. PATENT DOCUMENTS

| 3,680,085 | * | 7/1972 | Del Signore | 342/128 |
| 4,079,377 | * | 3/1978 | Zur Heiden et al. | 342/109 |
| 4,110,754 | * | 8/1978 | Endo | 342/147 |
| 5,339,075 | * | 8/1994 | Abst et al. | 340/903 |
| 5,530,447 | * | 6/1996 | Henderson et al. | 342/70 |
| 5,877,726 | * | 7/1972 | Kudoh et al. | 343/700 |

FOREIGN PATENT DOCUMENTS 3420004   12/1985 (DE) .
0499706    8/1992 (EP) .

OTHER PUBLICATIONS

Publication entitled "Radar Handbook", edited by M. Skolnik; published by McGraw–Hill, 1990 (2nd Edition), pp. 18.8–18.17.

* cited by examiner

*Primary Examiner*—John B. Sotomayor
(74) *Attorney, Agent, or Firm*—W. F. Fasse; W. G. Fasse

(57) ABSTRACT

A method for operating a radar system using at least two antennas provides an increased angular resolution for determining the angular position, radial velocity, and/or distance to a reflection object. A plurality of successive measuring phases are carried out in at least one measuring process. In each measuring phase, operation is repeatedly switched between a transmitting operation in which a transmitted signal pulse is emitted, and a receiving operation in which reflection signals are detected as received signals in the pulse pause interval between successive transmitted pulses. In at least one measuring phase, two different neighboring antennas of the radar system are used respectively as the transmitting antenna for emitting the transmitted signal and as the receiving antenna for detecting the reflected signal. In this manner, the respective receiving antenna monitors only the angular range of overlap between the emitted beam of the transmitting antenna and the field of view of the receiving antenna. The information provided by the detected signals in this overlapping angular range achieves an increased angular resolution. The method is particularly suitable for operating a separation distance warning system for a motor vehicle.

15 Claims, 2 Drawing Sheets

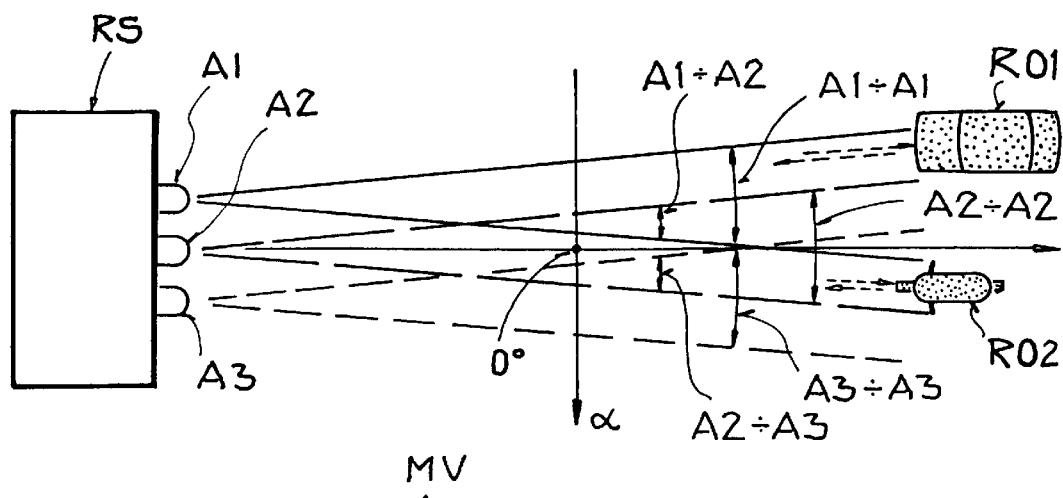
FIG. 2A
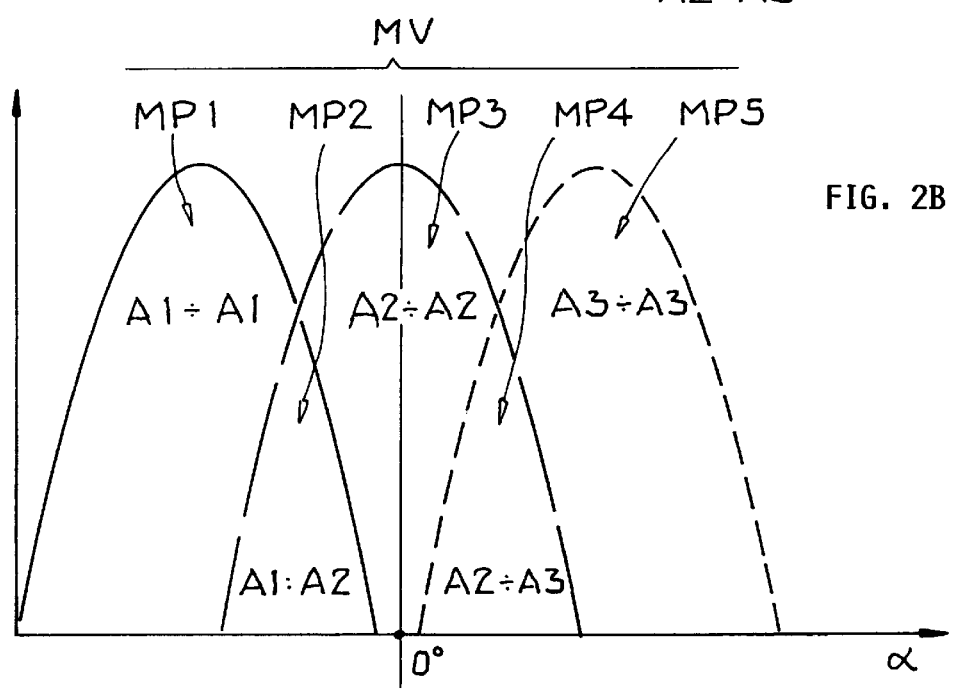
FIG. 2B
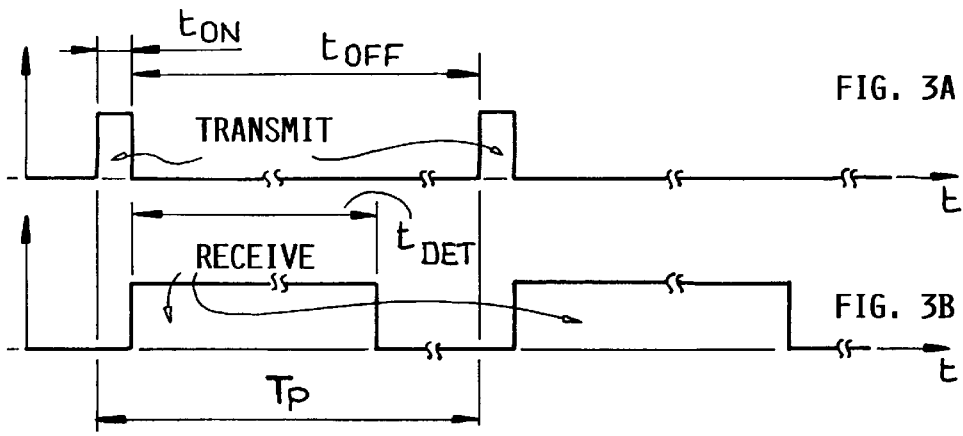
FIG. 3A
FIG. 3B

METHOD OF OPERATING A MULTI-ANTENNA PULSED RADAR SYSTEM

PRIORITY CLAIM

This application is based on and claims the priority under 35 U.S.C. §119 of German Patent Application 198 29 762.9, filed on Jul. 3, 1998, the entire disclosure of which is incorporated herein by reference.

FIELD OF THE INVENTION

The invention relates to a method for operating a pulsed radar system that uses at least two antennas for detecting or monitoring in different angular ranges, so as to determine the distance, the angular position, and/or the radial velocity of a reflection object or target object in the field being monitored. The invention further relates to a circuit arrangement for carrying out the method.

BACKGROUND INFORMATION

It is generally known to use radar systems for determining the distance or range from the radar system to moving or stationary target objects, and/or for determining the radial velocity or the relative velocity of such target objects. The radar systems are typically adapted for use in different distance ranges. The main field of use of such radar systems is typically in long range applications with a relatively large distance, either up to 150 km or up to 300 km, depending on the application, between the radar system and the target object. An example of such a long range application of radar systems is in the field of aviation, for purposes of air traffic control or for navigation of aircraft.

Recently, on the other hand, applications have also arisen for radar monitoring in very short distance ranges between the radar system and the target objects. For example, such a close range or short range is up to 20 m or 250 m depending on the particular application. One such a short range application of a radar system is in the field of motor vehicles, for monitoring the traffic space around a particular motor vehicle, e.g. for determining the separation distance or spacing of the subject motor vehicle from other preceding, following, or approaching motor vehicles or other reflection objects or target objects. The radar system may alternatively or additionally be used for determining the relative velocity of the subject motor vehicle with respect to other preceding, following, or approaching motor vehicles or other reflection objects.

In such a radar system, an oscillator generates a high frequency analog transmitted signal, having a frequency in the GHz range, typically between 18 GHz and 94 Hz. Then a transmitting antenna emits this transmitted signal into an observation area, i.e. an area that is to be observed for monitored by the radar. After the signal transits the transmission path and is reflected back from the reflection objects located in the observation area, the reflection or echo signal is detected as a received signal by a receiving antenna. Then, the received signal is evaluated in a signal processing circuit with regard to the transit time and/or the frequency shift and/or the phase shift of the reflected received signal relative to the original transmitted signal. From this evaluation, the necessary distance information and/or velocity information can be determined.

Two different types of radar systems are generally in use, namely a pulsed radar system and a frequency modulated continuous wave (FMCW) radar system. These two types of radar systems are distinguished from each other based on the measuring principle that is carried out, and especially in the manner of generating the transmitted signal and in the time sequence or progression of the transmitted signal itself.

In a pulsed radar system, the transmitted signal is cyclically interrupted, in other words, such a radar system emits transmitted pulses having a respective determined pulse duration. During the respective pulse pause interval between each two successive transmitted pulses, the reflection signals resulting from reflections or echoes of the preceding transmitted pulse are detected as received signals. As such, the pulsed radar system operates with alternating transmitting and receiving operating phases. The distance or range from the radar system to the reflection objects is determined by a direct measurement of the signal transit time. The desired distance resolution of the pulsed radar system can be prescribed and selected by a corresponding selection of the pulse duration or pulse width of the transmitted pulses. To select a distance range, the signal processing of the received signal typically uses a plurality of distance or range gates, which respectively correspond to various signal transit times and thereby are selective for a very particular distance.

It is very easy to achieve a decoupling of transmitted and received signals in the operation of the pulsed radar system. In other words, a side-to-side crosstalk of the transmitted signal into the received signal can be completely prevented by a suitable switching from the transmitting operation to the receiving operation, for example by means of transmit-receive switches. Moreover, the dynamic range of the received signal that is to be processed, i.e. the input dynamics in the detection of the received signal, can be significantly reduced by prescribing a range-dependent amplification to be carried out in the signal processing, by means of a regulation of the sensitivity of the signal amplification dependent on the transit time, commonly known as "Sensitive Time Control" (STC).

In an FMCW radar system on the other hand, the transmitted signal is continuously emitted as a continuous wave (CW), wherein the transmitting frequency of the transmitted signal is varied by frequency modulation (FM) to have a predetermined frequency modulation characteristic over time. The received signal is detected simultaneously while the transmitted signal is being continuously emitted. In view of the simultaneous transmitting and receiving operations, a rather high expense and effort is necessary for achieving an adequate decoupling of the transmitted signals from the received signals. This results in a high cost for such a radar system, and also results in interfering side effects.

In view of the difficulties or disadvantages encountered with FMCW radar systems, it is commonly the practice to use pulsed radar systems or particularly pulse Doppler radar systems in short range applications as mentioned above. For example, such pulsed radar systems are typically used for monitoring the traffic space surrounding a subject motor vehicle so as to detect reflection objects represented by obstacles and/or other motor vehicles within this traffic space, whereby the distance or range, the relative velocity, and the position of the reflection objects can be determined. An important characteristic parameter for judging the quality of the pulsed radar system is the angle measuring accuracy, i.e. the angular resolution of the azimuth angle by which different reflection objects can be discriminated or distinguished from each other.

In order to increase the resolution capability, it is known to use a plurality of antennas (i.e. at least two antennas) in a radar system. The publication "Radar Handbook" edited by M. Skolnik and published by McGraw-Hill, 1990 (2nd Edition), describes a so-called monopulse radar method, in which a transmitted signal is emitted in a broad transmitted beam, and two receiving antennas are arranged symmetrically relative to the transmitted beam for detecting the reflection signals (respectively in relation to the azimuth angle and the elevation angle). An evaluating circuit evaluates the difference and the sum of the two received signals provided by the two antennas respectively in relation to the azimuth angle and the elevation angle, and thereby the angular positions of the reflection objects can be determined.

Published European Patent Application 0,499,706 discloses a so-called pulse Doppler radar method and system in which the same antenna is used for emitting the transmitted signal and for detecting the received signal. By means of appropriate switching and frequency shifting, a single oscillator is used for generating the transmitted signal and for generating an internal or local oscillator signal used in connection with the reception.

SUMMARY OF THE INVENTION

In view of the above, it is an object of the invention to provide a method of operating a radar system with which it is possible to determine the angular position of reflection objects with high accuracy in a simple manner and at a low cost. It is also an object of the invention to provide a circuit arrangement for carrying out such a method. The invention further aims to avoid or overcome the disadvantages of the prior art, and to achieve additional advantages, as apparent from the present specification.

The above objects have been achieved in a method according to the invention, for operating a radar system that includes at least two antennas for monitoring different angular ranges in a field or area to be monitored. According to the method, the distance, i.e. range, the angular position, and/or the radial velocity of reflection objects present in the monitored area is determined in at least one measuring process including a plurality of measuring phases. To achieve this, the radar system is repeatedly switched back and forth between a transmitting operation and a receiving operation in each measuring phase of the measuring process. A signal pulse of a pulsed transmitted signal having a predetermined pulse duration is emitted respectively during each transmitting operation. During each receiving operation, reflection signals are detected as received signals during a respective pulse pause interval between the successive transmitted pulses of successive transmitting operations.

Especially according to the invention, the same antenna is used as a transmitting antenna for emitting the pulsed transmitted signal and as a receiving antenna for detecting the received signals during at least one of the measuring phases of the measuring process. On the other hand, during at least one other measuring phase of the measuring process, different ones of the plural antennas, and particularly adjacently arranged antennas, are used as the transmitting antenna and the receiving antenna respectively.

According to the invention, during each measuring phase of a measuring process, the radar system is repeatedly switched-over multiple times at short time intervals, between a transmitting operation (i.e. emission of the transmitted signal) and a receiving operation (i.e. detection of the received signal). The ratio of the time duration of the transmitting operation relative to the time duration of the receiving operation in this context can be prescribed as desired or as needed for the requirements of any particular application. During at least one measuring phase of the measuring process, different ones of the plural antennas are used for emitting the transmitted signals during the transmitting operation and for detecting the received signals during the receiving operation. Particularly, these different antennas used respectively for transmitting and receiving are adjacently arranged antennas of which the monitored angular ranges overlap.

In contrast, during the remaining measuring phases or at least one other measuring phase of the measuring process, the same antenna is used both as a transmitting antenna for emitting the transmitted signals in the transmitting operation and as a receiving antenna for detecting the received signals during the receiving operation.

In view of the above, during at least one measuring phase of the measuring process, a respective switch-over between two adjacently arranged antennas of the radar system is carried out simultaneously with each switch-over between the transmitting operation and the receiving operation. In this manner, only those reflection signals reflected from objects that lie in the range of overlap of the transmitting beam of the transmitting antenna overlapping with the field of view of the differently oriented receiving antenna are detected as received signals.

By evaluating the signals received from the overlapping ranges, and especially with respect to the angle dependent amplitude or intensity of the reflection signals, in these measuring phases using different transmitting and receiving antennas, it is possible to obtain additional information. Namely, by additionally taking into account the areas of overlap between adjacent antennas in the signal evaluation, the total information obtained is equivalent to the information that could be obtained by physically increasing the number n of antennas of the radar system to the increased number 2n−1. In other words, by evaluating the signals in this manner according to the invention, the angular range of overlap between adjacent antennas respectively acts or provides the same information as an additional physical antenna would otherwise provide. Hereby, it is possible to increase the angular measuring accuracy and the performance capacity of the radar system. These benefits are especially important in the application of the radar system for monitoring the traffic space around a motor vehicle, because it is necessary to reduce the size, complexity, and cost of the physical radar system hardware to a minimum while achieving the highest possible resolution and accuracy.

Switching-over between the transmitting antenna and the respective different receiving antenna while switching between transmitting operation and receiving operation is achieved by means of an antenna switch, which may for example be a high frequency switch or switch-over device, which is actuated and controlled by a control unit of the radar system. In this context, the actuation and control of the antenna switch is carried out synchronously with the switching-over of the transmit-receive switch and the local oscillator switch between transmitting operation and receiving operation. In order to achieve this, the antenna switch must be rapidly switchable, i.e. this switch must have a high limiting frequency. The switch-over between the transmitting antenna and the respective different receiving antenna is carried out in a short time, for example within 5 ns.

The inventive method for operating a radar system achieves the following advantages. The additional information obtained due to the switching of the antenna from a transmitting antenna to a respective different receiving antenna makes it possible to achieve a high angular measuring accuracy or angular resolution, and therewith an improved separation and discrimination between adjacent target objects. By appropriately or correspondingly embodying the required antenna switch, it is possible to implement the present invention in previously existing pulse radar systems without additional hardware costs or efforts beyond this antenna switch and the associated control hardware and/or software. Moreover, the present invention can be utilized in connection with all pulsed radar systems having at least two antennas, i.e. any desired plural number of antennas. All of the usual advantages of a pulsed radar system or pulse Doppler radar system with respect to the signal processing and multi-target capabilities are maintained.

BRIEF DESCRIPTION OF THE DRAWINGS

In order that the invention may be clearly understood it will now be described in connection with an example embodiment, with reference to the accompanying drawings, wherein:

FIG. 2A is a schematic diagram representing the spatial arrangement of three antennas in a radar system and the transmitted beams respectively transmitted in different azimuth angular ranges by the three antennas;

FIG. 2B is a diagram showing the angle-dependent amplitude or intensity of the respective received signals detected by the receiving antennas;

FIG. 3A is a timing diagram showing the time sequence of the transmitted signal pulses in a measuring phase of a measuring process; and FIG. 3B is a timing diagram coordinating with FIG. 3A, but showing the time sequence of received signals during a measuring phase of a measuring process.

Figure 1:
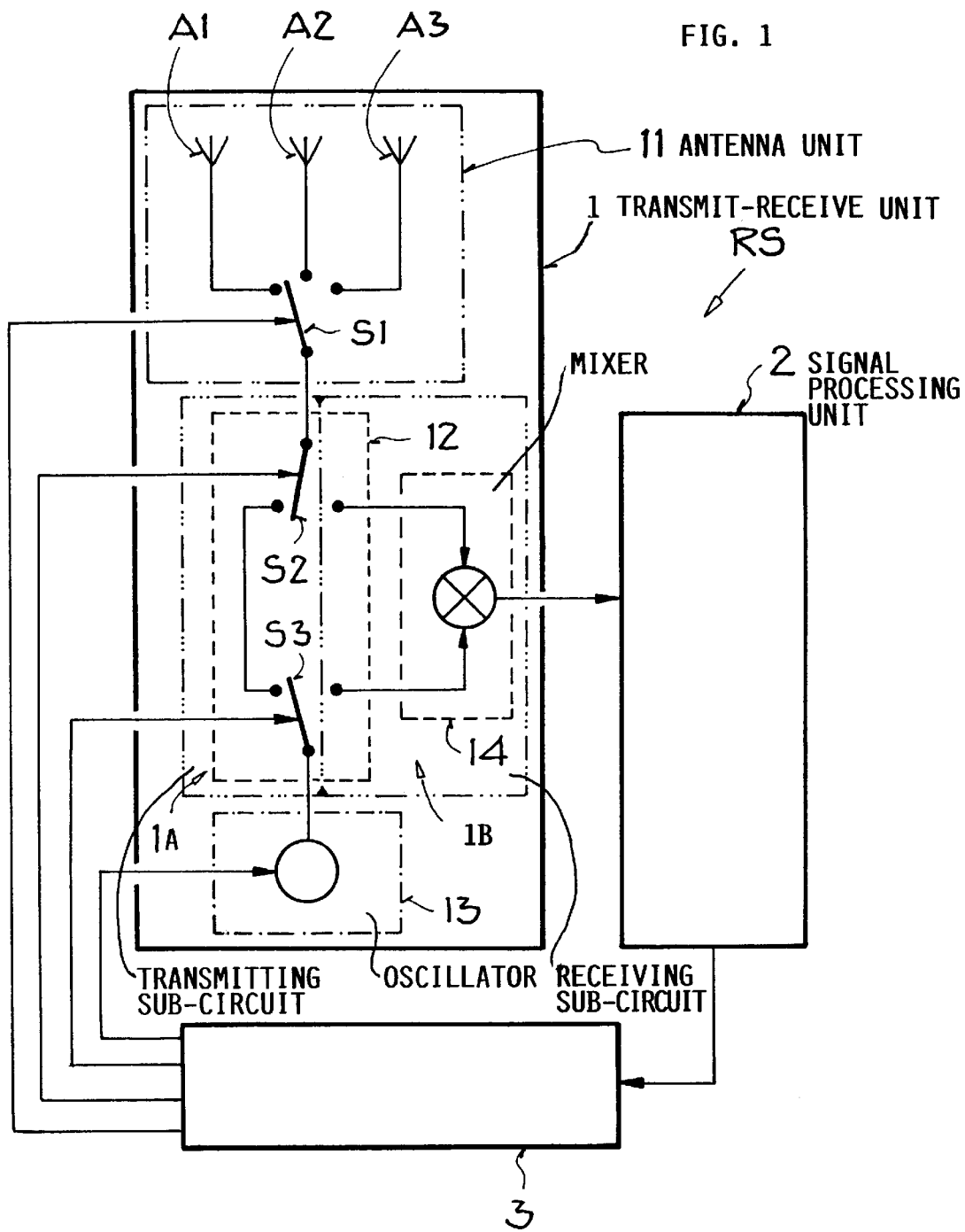
FIG. 1 is a schematic block circuit diagram of a radar system used according to the invention as a distance sensor for a motor vehicle separation distance warning system.

DETAILED DESCRIPTION OF PREFERRED EXAMPLE EMBODIMENTS AND OF THE BEST MODE OF THE INVENTION

Distance sensors used in separation distance warning systems for motor vehicles must be able to determine the distance or range and in some cases the relative velocity of reflection objects located in the pertinent observation field, with high resolution and without ambiguity. These reflection objects may particularly be preceding, following, or approaching vehicles, pedestrians, or any other radar reflection objects present in the pertinent traffic field or observation area around the subject motor vehicle. For example, the desired unambiguous distance measuring range or monomode operation range may be 150 m (which is relatively small in comparison to other radar systems), the desired distance resolution may be 1 m, and the desired velocity resolution may be 1 km/h. Moreover, it is a constant goal to achieve a good angular resolution, i.e. a good separation and discrimination ability between different adjacent reflection objects, for example between several vehicles driving ahead of the subject motor vehicle on different traffic lanes. Such separation between the reflection objects must be achieved with sufficient accuracy. For example, it is desirable to achieve a resolution capability of the azimuth angle measurement, or an angular resolution, of 0.1°.

As will be described in further detail below in connection with FIGS. 1 to 3, a pulse Doppler radar system RS includes a plurality of antennas A1, A2 and A3 and is operated to carry out the above mentioned distance and angular position determinations. Particularly, the radar system is operated in plural successive measuring phases of at least one measuring process, whereby a transmitted signal with a transmitting frequency or carrier frequency of 76.5 GHz, for example, is emitted by one of the plural antennas of the radar system in a particular angular range during a transmitting operation phase. Then, the reflection signal resulting from the reflection of the transmitted signal from any reflection objects, such as preceding vehicles or obstacles present in the particular respective angular range, is detected as an analog received signal or echo signal by a receiving antenna of the radar system in a receiving operation phase. The same antenna can be used for the transmitting operation and for the receiving operation in one measuring phase of the measuring process. However, in at least one other measuring phase of the measuring process, a switching of antennas is carried out. Namely, different antennas and particularly adjacently arranged antennas are used for the transmitting operation and for the receiving operation respectively. These different antennas are provided in an antenna array for detecting or monitoring adjacent angular ranges within the field of view or area to be monitored.

The repetitive switching-over from transmitting operation to receiving operation within one measuring phase of the measuring process is carried out in short time intervals by means of a high frequency (HF) switching unit that is actuated and controlled by a control unit. Whenever a switching of antennas is to be carried out, the system switches over from the transmitting antenna to the receiving antenna simultaneously with the switch-over from transmitting operation to receiving operation.

A signal processing unit receives and further processes the received signal during a specified time interval within the receiving operation, and evaluates the received signal with respect to the frequency difference or shifting and/or the phase difference or shifting relative to the transmitted signal, whereby the desired distance information and velocity information (as required) are obtained from this evaluation by carrying out a spectral analysis.

As shown in FIG. 1, a representative example embodiment of a pulse Doppler radar system RS suitable for carrying out the inventive operating method has the following construction. A transmit-receive unit 1 includes a transmitting side sub-circuit 1A for emitting the transmitted signals and a receiving side sub-circuit 1B for detecting the received signals. The essential components of the transmit-receive unit 1 are incorporated together as a compact integral module. The transmit-receive unit 1 further includes an antenna unit 11 for emitting the transmitted signals and also for detecting the received signals. In order to receive and transmit signals in different angular ranges, the antenna unit 11 comprises three separate antennas A1, A2 and A3 as well as an antenna selector switch S1 for selecting the respective operating antenna A1, A2 or A3.

In this context, during one measuring phase of the measuring process, it is possible to use a given one of the antennas A1, A2 or A3 as both a transmitting antenna during the transmitting operation and as a receiving antenna during the receiving operation. On the other hand, in the case when an antenna change is to be carried out after a given antenna, for example A1 or A2, has been used as the transmitting antenna, then the respective adjacent antenna A2 or A3 will be used as the receiving antenna when switching from the transmitting operation to the receiving operation. Particularly in this case, the antenna selector switch S1 is switched to the respective adjacent antenna at the end of the respective transmitting operation, in parallel or simultaneously with the switching-over from the transmitting operation to the receiving operation.

The transmit-receive unit 1 further includes a high frequency (HF) switching unit 12 overlapping with or forming a subsystem of the transmitting side 1A and the receiving side 1B. More particularly, the HF switching unit 12 includes two HF switches, namely a transmit-receive switch S2 and a local oscillator (LO) switch S3, whereby switching-over these two switches between the transmitting side 1A and the receiving side 1B of the transmit-receive unit 1 achieves a switch-over between the transmitting operation and the receiving operation. The synchronous switching of the transmit-receive switch S2 and the LO switch S3, as well as of the antenna selector switch S1 in the case of carrying out an antenna change, is carried out dependent on the pulse duration of the transmit pulse of the transmitted signal, whereby such a pulse duration may amount to 50 ns, for example.

For the transmitting operation, both the transmit-receive switch S2 and the LO switch S3 are in the left position as shown in FIG. 1, i.e. switched to the transmitting side 1A, while the antenna selector switch S1 is connected to any selected one of the antennas A1 or A2 or A3 acting as the transmitting antenna. On the other hand, for the receiving operation both the transmit-receive switch S2 and the LO switch S3 are switched to the right position as shown in FIG. 1, i.e. switched to the receiving side 1B, while the antenna selector switch S1 is connected to one of the antennas to act as the receiving antenna. In this context, the selected receiving antenna may be the same antenna A1 or A2 or A3 that was selected in the immediately preceding transmitting operation, or the selected receiving antenna can be the antenna A2 or A3 that is immediately adjacent to the previously selected transmitting antenna A1 or A2.

The transmit-receive unit 1 also includes an oscillator 13 such as a voltage controlled oscillator (VCO) having a power of 10 mW, for example. This oscillator 13 generates a high frequency radiation having the oscillator frequency of 76.5 GHz for example, which represents the carrier frequency of the transmitted pulse signal, and can advantageously also be used as a basis for a local or internal oscillator frequency in connection with the receiving operation as will be described below.

In the measuring phases of the measuring process, a repetitive switching-over between the transmitting operation and the receiving operation is carried out. Thereby, the reflection or echo signals that arise as reflections of the previously emitted transmitted pulse being reflected from any reflection objects located within the angular range monitored by the selected antenna are detected as received signals in the receiving side 1B of the transmit-receive unit 1, before the emission of the next successive transmitted pulse. In other words, the reflections or echoes arising from the immediately preceding transmitted signal are detected in the respective subsequent receiving operation before switching from the receiving operation to the next transmitting operation. To achieve this, the antenna selector switch S1 is connected to the selected receiving antenna for a predetermined receiving time interval. In this context, the receiving time interval can be varied or adjusted as needed for any given application, whereby the range or distance being monitored by the radar system in the respective associated angular range is correspondingly varied or adjusted. Thereby, the operating range of the system in each particular angular range can be selected as desired by appropriately selecting the receiving time interval in that angular range, i.e. associated with that particular antenna.

A mixer 14 is provided in the receiving side 1B of the transmit-receive unit 1. The mixing frequency of this mixer 14, for example, corresponds to the receiving frequency, which is lower than the transmitting frequency by or to the extent of the intermediate frequency. This mixer 14 provides a mixed signal by multiplying the received signal with the oscillator frequency that is provided to the mixer 14 as a constant frequency from the oscillator 13 through the LO switch S3 during a pulse pause interval, i.e. during the receiving operation. In this manner, the mixer 14 transforms the received signal into the corresponding mixed signal in the intermediate frequency plane.

The intermediate frequency mixed signal is provided from the mixer 14 to a signal processing unit 2 for further processing. The signal processing unit 2 may include any conventional or known arrangement of components for processing and evaluating the received signals. For example, the signal processing unit 2 includes a preamplifier stage, at least one signal filter, an analog-to-digital converter (A/D converter) and a digital signal processor. The evaluation of the received signal in this context is carried out within a predetermined time interval during a receiving operation phase.

A control unit 3 is connected to the signal processing unit 2 and the transmit-receive unit 1 in order to actuate and control the antenna selector switch S1 of the antenna unit 11, and the two high frequency switches, namely the transmit-receive switch S2 and the LO switch S3 of the high frequency switching unit 12, and to control the oscillator 13.

During the time in which the separation distance warning system is active, a plurality of successive cyclical measuring processes are carried out. In each single measuring process, a specified number of measuring phases can be prescribed, and within each single measuring phase a specified sequence of the transmitting antennas and receiving antennas to be used can be prescribed. In a radar system having the number "n" antennas, at a maximum 2n−1 different measuring phases can be prescribed per measuring process.

The time sequence of a measuring process will now be described in connection with FIGS. 2A and 2B. These figures schematically represent the various measuring phases taking place in one measuring process, dependent on the azimuth angle in the angular range detected by the radar system. FIG. 2A schematically shows the spatial arrangement of the three antennas A1, A2 and A3 of the radar system RS on a motor vehicle, to achieve radar coverage over a range of positive and negative azimuth angle $\alpha$, whereby the optical axis of the radar system is defined with the azimuth angle $\alpha=0$. FIG. 2A also schematically shows the respective angular ranges A1÷A1, A2÷A2 and A3÷A3 covered by the transmitted signal beam emitted by each respective transmitting antenna A1, A2 or A3, and correspondingly detected or monitored by the respective antenna A1, A2 or A3. As can be seen, the respective angular range of the transmitted beam of adjacent antennas A1 and A2 overlap the reception "field of view" of respective adjacent antennas A2 and A3 in respective overlapping angular areas A1÷A2 and A2÷A3.

FIG. 2B schematically represents the amplitude or intensity of a received signal detected by each one of the respective receiving antennas A1, A2 or A3, which is a measure of the sensitivity of the radar system. Namely, FIG. 2B represents an idealized case for each of the receiving antennas showing the same given amplitude or intensity of a received signal. This representation clearly illustrates the reception characteristic of each antenna as a function of the azimuth angle $\alpha$, whereby a peak intensity or amplitude is received along the optical axis of the particular antenna and then the intensity falls off toward the edges of the field of view of the respective antenna. The antennas are so arranged and embodied that the edge zones of diminishing intensity of neighboring antennas overlap each other to form overlapping zones of reception intensity A1÷A2 and A2÷A3, as also apparent in FIG. 2A discussed above.

In connection with FIGS. 2A and 2B, an example involves a single measuring process MV having a total time duration of 50 ms, divided into five measuring phases MP1, MP2, MP3, MP4 and MP5, having respective equal durations of 10 ms, for example. In the first measuring phase MP1, the antenna A1 is used as the transmitting antenna in the transmitting operation and as the receiving antenna in the receiving operation. Thereby, this antenna A1 detects a first reflection object RO1, such as a motor vehicle, located in the negative range of azimuth angle α that is being monitored by the transmitted beam emitted by the antenna A1 and "seen" in the field of view of the antenna A1, represented by A1÷A1. A first reflection object RO1, such as a motor vehicle, is detected in this angular range.

In the second measuring phase MP2, the antenna A1 is used as the transmitting antenna during the transmitting operation, and the antenna A2 is used as the receiving antenna during the receiving operation. Thereby, during the measuring phase MP2, the antenna A2 will detect reflection signals arising from reflections only in the overlapping angular range of the azimuth angle α of the transmitted beam of the antenna A1 and the receiving field of view of the antenna A2, represented by A1÷A2. In other words, due to the switching from the transmitting antenna A1 to the receiving antenna A2, the monitoring effect during the measuring phase MP2 is to monitor only the overlapping range of the azimuth angle illustrated in FIGS. 2A and 2B as A1÷A2.

In the measuring phase MP3, the antenna A2 is used both as the transmitting antenna in the transmitting operation and as the receiving antenna in the receiving operation, and thereby the antenna A2 monitors the angular range covered by the transmitted beam as well as the receiving field of view of the antenna A2, namely the angular range A2÷A2, over the azimuth angle α around α=0. As shown in FIG. 2A, a second reflection object RO2 such as a pedestrian, bicycle, or motorcycle is located within this field of view of the antenna A2 and is therefore detected by its reflection or echo signal.

In the measuring phase MP4, the antenna A2 is used as the transmitting antenna in the transmitting operation, and the antenna A3 is used as the receiving antenna in the receiving operation. In this manner, during the measuring phase MP4, the antenna A3 will only monitor the overlap range A2÷A3 of the azimuth angle range between the transmitted beam of the antenna A2 and the receiving field of view of the antenna A3. Since the second reflection object RO2 is particularly located in this overlapping range of the azimuth coverage of the antenna A2 with the azimuth coverage of the antenna A3, the second reflection object RO2 will also be detected in this measuring phase MP4.

In the measuring phase MP5, the antenna A3 is used both as the transmitting antenna in the transmitting operation and also as the receiving antenna in the receiving operation. In this manner, during the measuring phase MP5 the antenna A3 will monitor the azimuth angle range A3÷A3 covered by the transmitted beam as well as the field of view of the antenna A3 for positive azimuth angles α as represented in FIGS. 2A and 2B. In the situation depicted in FIG. 2A, the antenna A3 operating in the measuring phase MP5 will thus detect the second reflection object RO2.

In other measuring processes, a different sequence of measuring phases may be carried out, relative to the above described sequence. Any desired number or subset of the maximum number of possible measuring phases can be carried out in any particular measuring process. Moreover, the individual measuring phases within a measuring process can be selected to have differing durations. In any event, the above described information provided by the successive measuring phases is evaluated in the signal processing unit to achieve an angular position resolution that is greater than the resolution that would otherwise be provided with the given number of antennas without evaluating the overlapping angular ranges. The resolution can be determined by the number of measuring phases carried out, whereby the overlapping angular ranges of detection discussed above provide additional angular location information similarly as if an additional antenna had been provided to monitor this overlapping range. In the example of FIG. 2A, the system can unambiguously determine that the first reflection object RO1 is located in the angular range of the first antenna A1 that does not overlap with the angular range of the second antenna A2, and that the second reflection object RO2 is located in the angular range of overlap between the antennas A2 and A3.

FIGS. 3A and 3B represent a portion of the time sequence of transmitting and receiving signals for a measuring phase MP1 of the measuring process MV as an example. Each of the measuring phases MP1, MP2, MP3, MP4 and MP5 of the measuring process MV involves a repetitive or multiple switching-over between the transmitting operation and the receiving operation. For example, in each measuring phase MP1, MP2, MP3, MP4 and MP5 of the measuring process MV, the operation switches over between transmitting and receiving 2000 times. In other words, in each one of the measuring phases MP1, MP2, MP3, MP4, MP5 of the measuring process MV, 2000 successive transmitted pulses are emitted alternating with 2000 reception cycles during the pulse pause intervals. The total period duration or length $T_P$ of a pulse cycle of a transmitting pulse consists of the pulse duration $t_{ON}$ (i.e. the transmitting interval during transmitting operation) and the pulse pause interval $t_{OFF}$. The receiving operation takes place during the pulse pause interval $t_{OFF}$, wherein the reflection signals are detected by a respective selected receiving antenna in a determined angular range of the azimuth angle α. During the receiving operation, a specified receiving duration $t_{DET}$ is prescribed as a receiving interval during which the return echo signals will be detected as received signals and further processed and evaluated.

As an example, the pulse duration $t_{ON}$ of the transmitted pulse is 50 ns, while the pulse pause interval $t_{OFF}$ between the successive transmitted pulses amounts to 4.95 µs, so that the total period duration or length $T_P$ of a pulse cycle amounts to 5 µs. As mentioned above, as an example, 2000 pulse cycles are allocated to each measuring phase of the measuring process, so that each respective measuring phase has a total time duration of 10 ms. As a further example, the reception period or interval $t_{DET}$ during the receiving operation amounts to 1 µs. In other words, all reflection signals incident on the respective selected receiving antenna within 1 µs after emission of the transmitted pulse will be detected and evaluated as received signals.

The pulse repetition frequency $f_{PW}$ is given by $f_{PW}=(T_P)^{-1}$, where $T_P=t_{ON}+t_{OFF}$. In the above example with a period duration or length $T_P$ of a pulse cycle amounting to 5 µs, the pulse repetition frequency $f_{PW}=200$ kHz. The duty cycle D is given by $D=t_{ON}/T_P$, which amounts to 1% in the above example with a pulse duration of $t_{ON}$ of the transmitted pulses being 50 ns and a period duration or length $T_P$ of a pulse cycle amounting to 5 μs. The switch-over from one antenna to another for carrying out an above described antenna change, specifically the switching time for switching from one transmitting antenna to a different receiving antenna while switching from transmitting operation to receiving operation, amounts to 5 ns, for example.

When prescribing the specifications of a radar system for carrying out the inventive method described herein, the following points should be taken into account. The pulse duration $t_{ON}$ of the transmitted pulses determines the average transmitting power and therewith the maximum operating range of the radar system. The desired angular resolution Δα of the radar system for discriminating or resolving separate reflection objects at the same distance and with the same relative velocity is determined by the number and the configuration of the antennas, and further by the overlapping of the angular ranges of the antennas and use of the overlapping information in successive measuring phases as described herein. The desired velocity resolution Δv of the radar system determines the required time duration of the measuring phases MP1, MP2, MP3, MP4 and MP5 of a measuring process MV. For examples with a transmitting frequency or carrier frequency of 76.5 GHz, and a time duration of the individual measuring phases MP1, MP2, MP3, MP4 and MP5 respectively each amounting to 10 ms, the result is a velocity resolution Δv of 5 km/h. The unambiguous distance range or distance monomode range $R_E$ of the radar system is determined by the period duration or length $T_P$ of a pulse cycle or from the pulse repetition frequency $f_{PW}$ according to the equation $R_E=T_P \cdot C$, where C is the speed of light. A person of ordinary skill in the art upon reading the present disclosure will be able to take these parameters and factors into account in order to provide the specifications of the radar system as necessary for any particular application.

While the above example embodiment has been described with reference to angular position detection with respect to an azimuth angle, the same inventive method and arrangement apply similarly for elevation angle detection. Moreover, the inventive method can be used with a radar system having a two-dimensional antenna array, whereby azimuth angle detection and elevation angle detection can be carried out simultaneously according to the inventive method applied in two dimensions.

As used herein, the term "monitoring" of a given angular range by an antenna generally refers to the antenna emitting a beam of emitted signals in that given angular range, and/or the antenna receiving reflected signals from that given angular range.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of operating a radar system including at least two antennas respectively directed to monitor respective different angular ranges in an area to be monitored, for determining at least one of a distance, angular position and radial velocity of a reflection object located in said area to be monitored, said method comprising carrying out at least one measuring process including a plurality of measuring phases, wherein:

each said measuring phase comprises plural alternating transmitting operations and receiving operations;

each said transmitting operation comprises emitting, from a transmitting antenna selected among said at least two antennas, a respective transmitted signal pulse having a pulse duration ($t_{ON}$);

each said receiving operation comprises activating a receiving antenna selected among said at least two antennas to be able to receive at least one of any reflection signals that may be reflected from said reflection object and incident on said receiving antenna during a respective pulse pause interval having a pause duration ($t_{OFF}$) between successive ones of said transmitted signal pulses;

in at least one of said measuring phases, the same selected one of said at least two antennas is used as said transmitting antenna in said transmitting operations and as said receiving antenna in said receiving operations; and in at least another of said measuring phases, two different selected ones of said at least two antennas are respectively used as said transmitting antenna in said transmitting operations and as said receiving antenna in said receiving operations.

2. The method according to claim 1, wherein:

said at least two antennas are directed so that at least some of said respective different angular ranges partially overlap one another; and in said another of said measuring phases, said two different ones of said antennas respectively monitor said respective different angular ranges that partially overlap one another.

3. The method according to claim 2, wherein, in said another of said measuring phases, said receiving antenna receives reflection signals reflected from said reflection object only if said reflection object is at least partially located in an overlapping angular range in which said different angular ranges partially overlap one another.

4. The method according to claim 2, wherein said two different ones of said antennas in said another of said measuring phases are physically arranged adjacent to each other.

5. The method according to claim 1, wherein said two different ones of said antennas in said another of said measuring phases are physically arranged adjacent to each other.

6. The method according to claim 1, wherein said radar system further includes an antenna selector switch adapted to be selectively switchably connected independently to said at least two antennas, and wherein said receiving antenna and said transmitting antenna are respectively selected from among said at least two antennas by correspondingly switching said antenna selector switch.

7. The method according to claim 6, wherein said switching of said antenna selector switch is carried out within 5 ns.

8. The method according to claim 6, wherein said radar system further includes a control unit connected for control signal transmission to said antenna selector switch, and wherein said switching of said antenna selector switch is carried out responsive to control signals provided by said control unit.

9. The method according to claim 6, wherein said radar system further includes a transmit-receive switch connected to said antenna selector switch and a local oscillator switch selectively connectable with said transmit-receive switch, wherein said method further comprises repeatedly switching between said transmitting and receiving operations by repeatedly synchronously switching said transmit-receive switch and said local oscillator switch between a transmit position and a receive position, wherein said antenna selector switch remains connected to said same selected one of said at least two antennas during said transmitting and receiving operations in said at least one of said measuring phases, and wherein said antenna selector switch is repeatedly switched between said two different ones of said at least two antennas in synchronism with said repeated switching of said transmit-receive switch and said local oscillator switch to switch between said transmitting and receiving operations in said at least another of said measuring phases.

10. The method according to claim 1, wherein said different angular ranges comprise different azimuth angular ranges.

11. The method according to claim 1, wherein said different angular ranges comprise different azimuth angular ranges and different elevation angular ranges.

12. The method according to claim 1, wherein:
  said at least two antennas include first and second antennas that respectively transmit and receive signals in respective first and second ones of said different angular ranges, which partially overlap each other in a first overlapping angular range;
  in a first one of said measuring phases, said first antenna is used as said transmitting antenna in said transmitting operations and as said receiving antenna in said receiving operations;
  in a second one of said measuring phases, said second antenna is used as said transmitting antenna in said transmitting operations and as said receiving antenna in said receiving operations;
  in a third one of said measuring phases, said first antenna is used as said transmitting antenna in said transmitting operations and said second antenna is used as said receiving antenna in said receiving operations; and
  said first, second and third measuring phases can be carried out in any order relative to each other.

13. The method according to claim 12, wherein:
  said at least two antennas further include a third antenna that transmits and receives signals in a third one of said different angular ranges, which partially overlaps said second different angular range in a second overlapping angular range;
  in a fourth one of said measuring phases, said third antenna is used as said transmitting antenna in said transmitting operations and as said receiving antenna in said receiving operations;
  in a fifth one of said measuring phases, one of said second and third antennas is used as said transmitting antenna in said transmitting operations and the other of said second and third antennas is used as said receiving antenna in said receiving operations; and
  said first, second, third, fourth and fifth measuring phases can be carried out in any order relative to each other.

14. The method according to claim 12, further comprising evaluating said at least one reflection signal received respectively in each one of said measuring phases to determine at least said angular position of said reflection object.

15. A radar system comprising:
  a plurality of antennas that each respectively have different angular fields of view and that are arranged so that said fields of view partially overlap one another;
  an antenna selector switch that is selectively switchably connectable to each one of said antennas independently;
  a signal mixer;
  a transmit-receive switch permanently connected to said antenna selector switch;
  an oscillator;
  a local oscillator switch permanently connected to said oscillator;
  a signal processing unit connected to an output of said signal mixer; and
  a control unit connected for control signal transmission to said antenna selector switch, said transmit-receive switch, and said local oscillator switch;
  wherein:
    said transmit-receive switch is selectively switchably connectable to said mixer and to said local oscillator switch independently;
    said local oscillator switch is selectively switchably connectable to said mixer and to said transmit-receive switch independently; and
    said control unit is so arranged, configured and adapted so that it causes said transmit-receive switch and said local oscillator switch respectively to switch cyclically and synchronously between being connected to each other and being connected to said mixer, and synchronously therewith causes said antenna selector switch to switch cyclically between being connected to a first one of said antennas and being connected to a second one of said antennas.

* * * * *